United States Patent [19]

Davenport et al.

[11] Patent Number: 5,490,373
[45] Date of Patent: Feb. 13, 1996

[54] DEVICE AND METHOD FOR TRUING DOFFERS

[75] Inventors: Donald K. Davenport, Woodburn; Joel M. Schreiner, Ankeny, both of Iowa

[73] Assignee: Deere & Company, Moline, Ill.

[21] Appl. No.: 346,670

[22] Filed: Nov. 30, 1994

[51] Int. Cl.⁶ ............................................. A01D 46/18
[52] U.S. Cl. ........................................ 56/41; 56/50
[58] Field of Search ......................... 56/28, 33, 34, 56/45, 41, 50, 44, 12.1, 2; 451/415, 416; 29/76.1, 76.3

[56] References Cited

U.S. PATENT DOCUMENTS

| | | | |
|---|---|---|---|
| 972,795 | 10/1910 | Appleby | 56/41 |
| 2,440,767 | 5/1948 | Baker | 56/41 |
| 2,660,851 | 12/1953 | Hagen | 56/41 |
| 2,664,689 | 1/1954 | Walker | 56/41 |
| 2,670,585 | 3/1954 | Hagen et al. | 56/41 |

*Primary Examiner*—Terry Lee Melius
*Assistant Examiner*—Neather Chun Shackelford

[57] ABSTRACT

A doffer grinding mechanism constructed in accordance with the teachings of the present invention consists of a rotary file type grinding stem which is larger in diameter than the cotton picker spindles of a machine. The grinding stem, which temporarily replaces one of the conventional spindle assemblies in a row of spindles, is screwed into the picker bar which remains in the machine. The row unit is run, and the doffer is adjusted against the grinding stems. Doffers can be quickly trued in the field without the need for a doffer grinding machine and without complete disassembly of the doffer column from the row unit.

15 Claims, 3 Drawing Sheets

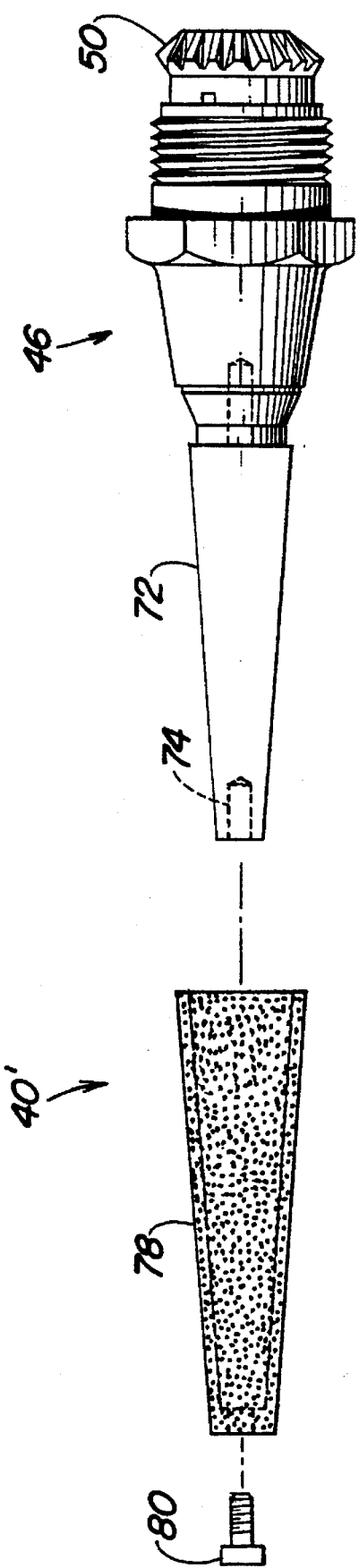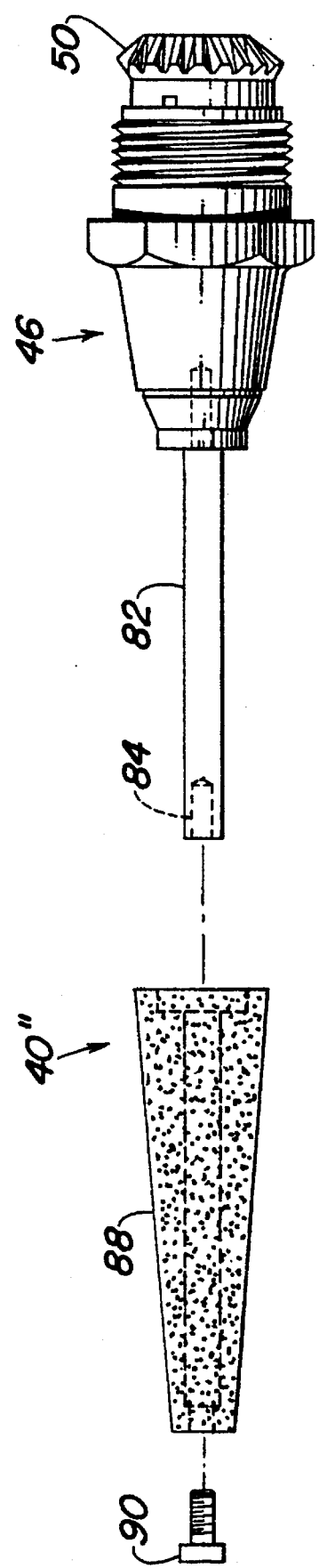

DEVICE AND METHOD FOR TRUING DOFFERS

BACKGROUND OF THE INVENTION

1. Field of the Invention

The present invention relates generally to cotton harvester doffers, and, more specifically, to a method and mechanism for truing doffers to improve picker operation.

2. Related Art

In the mechanical harvesting of cotton with spindle-type picking units, the cotton is removed from the spindle by the doffer-mechanism including doffers or rotating discs having tangential velocity significantly greater than that of the picking spindle. As a spindle is moved under the face of the doffer disc, the motion of the doffer relative to the spindle unwraps cotton from the spindle, strips the cotton off of the end of the spindle, and propels the cotton into the conveying air stream. Because of the abrasiveness of the cotton fibers, the rubber or urethane coating of the doffer disc erodes. Since effective doffing action is a function of doffer to spindle clearance, the doffer must be regularly adjusted to compensate for doffer pad wear. If the doffer to spindle clearance exceeds 0.010 inch, doffing performance is affected and spindle wrap problems ensue. Also, the leading edges of the doffer lugs become rounded and the dull edges are less effective as sharp edges in removing cotton from the spindle. Depending upon variations in plant heights and varying distribution of the cotton bolls on the plant, the amount of wear of the doffer discs varies along the height of the doffer assembly. A high concentration of cotton imputed at a narrow range of height effectively wears a "hole" in the high wear zone. Spindles above and below the high wear zone are still close to the doffer, but clearance is excessive in the critical area of the doffer.

Previously, the only accurate means of truing a doffer was to remove it from the machine and place it in a special doffer grinding machine which cotton picker service departments must purchase or otherwise have available in the shop. Because of the time, inconvenience and expense of doing this, doffer truing is seldom done. Frequently an attempt is made to true a doffer by adjusting the doffer column down against the rotating picker spindles. Since the tangential velocity of the doffer is so much greater than that of the spindle, the doffer sees the rounded backside of the spindle barb instead of the sharp cutting edge. Hence the doffer is cut very inefficiently. Eventually, by heat and friction, the doffer can be worn away until it is trued, but the process exerts excessive force on the spindle bearings which results in premature spindle bushing deterioration. Providing a quick, simple, and effective means of truing a doffer assembly without removing the doffer from the machine and without spindle bearing wear has been a continuing problem.

BRIEF SUMMARY OF THE INVENTION

It is therefore an object of the present invention to provide an improved doffer truing method and mechanism which overcome most or all of the abovementioned problems. It is a further object to provide such an improved method and mechanism which result in improved doffing action and thereby facilitates satisfactory picker operation over a broader range of crop conditions.

It is a further object of the present invention to provide an improved doffer truing method and mechanism wherein the doffers are trued to the exact configuration of a spindle passing through the doffer. It is a further object to provide such a method and mechanism wherein effects of doffer camber angle relative to the spindle are completely negated.

It is still another object of the present invention to provide an improved doffer truing method and mechanism which does not require a special servicing rig and wherein the doffer can be quickly, easily, and inexpensively trued while the doffer column remains in the picking unit. It is a further object to provide such a method and mechanism wherein doffer truing does not cause excessive wear to the spindle bushings.

A doffer grinding mechanism constructed in accordance with the teachings of the present invention consists of a rotary file type grinding stem which is larger in diameter than the cotton picker spindles of a machine. The grinding stems, which temporarily replace a conventional spindle assembly, are screwed into the spindle holes of a picker bar which is still in the machine. The row unit is run, and the doffer is adjusted against the grinding stems. A doffer with new pads can be assembled and quickly trued in the field without the need for a doffer grinding machine and without complete disassembly of the doffer column from the row unit.

Because of the ease with which a doffer can be trued, large "holes" otherwise worn in the doffer can be eliminated. The net doffer life is lengthened because the problem is corrected rather than allowed to get worse. The leading edges of the doffer lugs can be kept sharp. Unlike the process which attempts to true the doffer using the spindles, the truing process does not cause excessive wear to the spindle bushings. The doffer becomes trued to the exact configuration of a spindle passing through the doffer, and effects of doffer camber angle relative to the spindle are completely negated. The improved doffing action as a result of the truing process and mechanism will allow satisfactory picker operation over a broader range of crop conditions.

These and other objects, features and advantages of the present invention will become apparent to one skilled in the art upon reading the following detailed description in view of the drawings.

BRIEF DESCRIPTION OF THE DRAWINGS

FIG. 3 is a perspective view of an alternate embodiment of a grinding device for use with the row unit of FIG. 1.

FIG. 4 is a perspective view of yet another alternate embodiment of a grinding device.

DETAILED DESCRIPTION OF THE DRAWINGS

Figure 1:
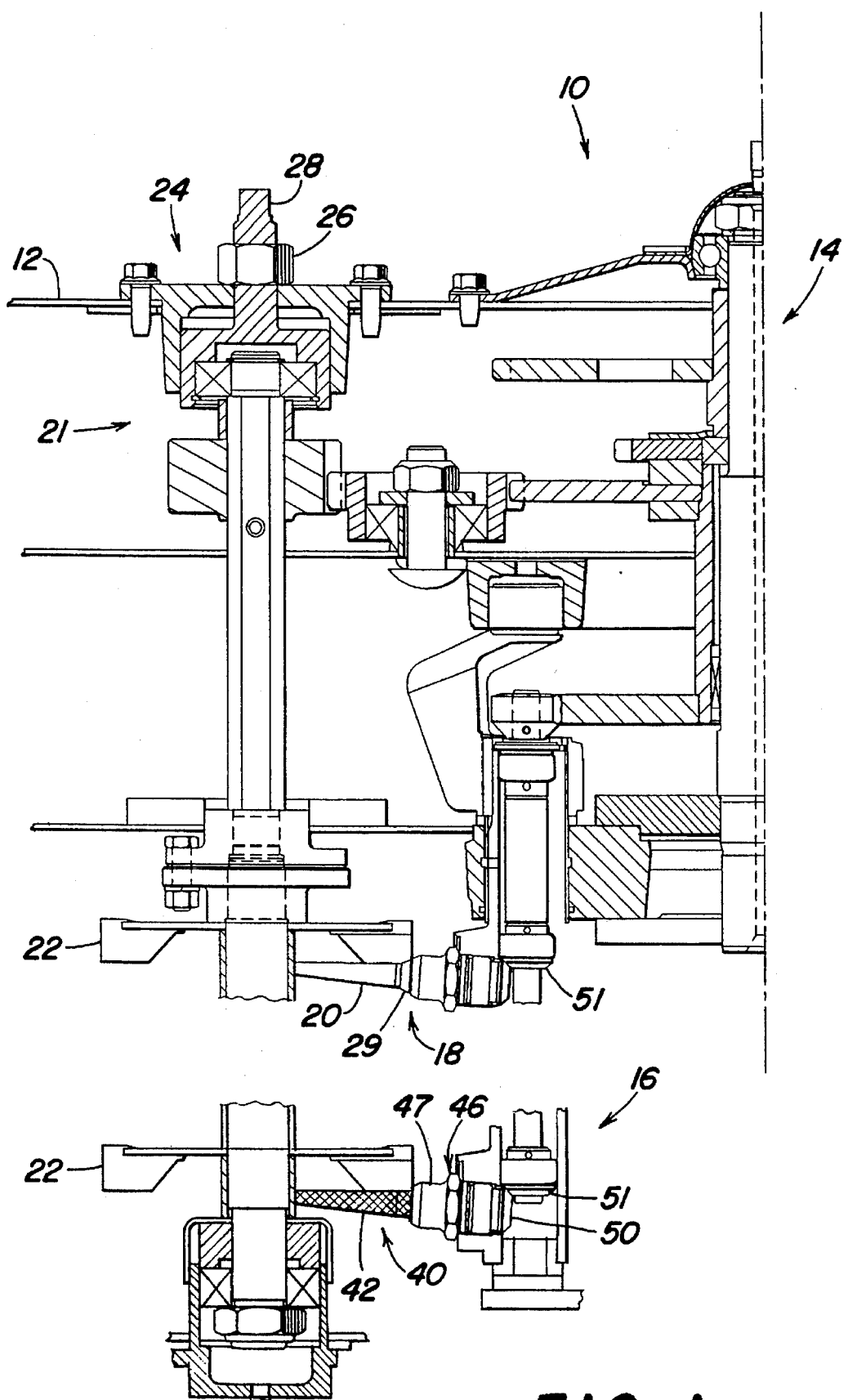
FIG. 1 is a side section view of a portion of a cotton harvester in-line row unit having a vertically adjustable doffer column located adjacent a picker drum with rows of cotton spindles.

Referring now to FIG. 1, therein is shown a portion of a cotton harvester 10 having a row unit housing 12. A picker drum 14 rotatably mounted in the housing 12 includes a plurality of picker bars 16 with vertically spaced threaded holes for receiving spindle assemblies 18. The assemblies 18 include rotatable spindles 20 which are driven by a conventional bevel gear drive located in the bar 16. The picker bars 16 on each drum 14 define vertically spaced rows of the spindles 20. A vertically adjustable doffer column 21 having a plurality of doffers 22 spaced such that one doffer is located above each row of spindles 20 is supported in the unit 12 adjacent the drum 14. A doffer adjusting assembly 24 supports the upper end of the column 21 from the row unit housing 12 and includes a locking nut 26 which is threaded onto a shaft 28. The shaft 28 may be rotated by a wrench when the locking nut 26 is loosened to move the column vertically and change the offset of the doffers 22 relative to the rows of spindles 20. The doffers 22 rotate above and preferably just out of contact with the spindles 20 to unwrap cotton from the spindles and direct the cotton into a conveying air stream. The spindle assemblies 18 include dust collars 29.

A moistener column having pads with spindle cleaning fins (not shown) is supported adjacent the drum 14 for cleaning the spindles 20 after cotton is doffed therefrom. The moistener column is movable relative to the spindles 20 between a cleaning position, generally in the paths of the rows of spindles 20, and a service position offset from the spindle paths. The row unit 12 is generally of conventional construction and so is described only in sufficient detail to orient the doffer grinding devices and the process for truing the doffers 22 described below.

Figure 2:
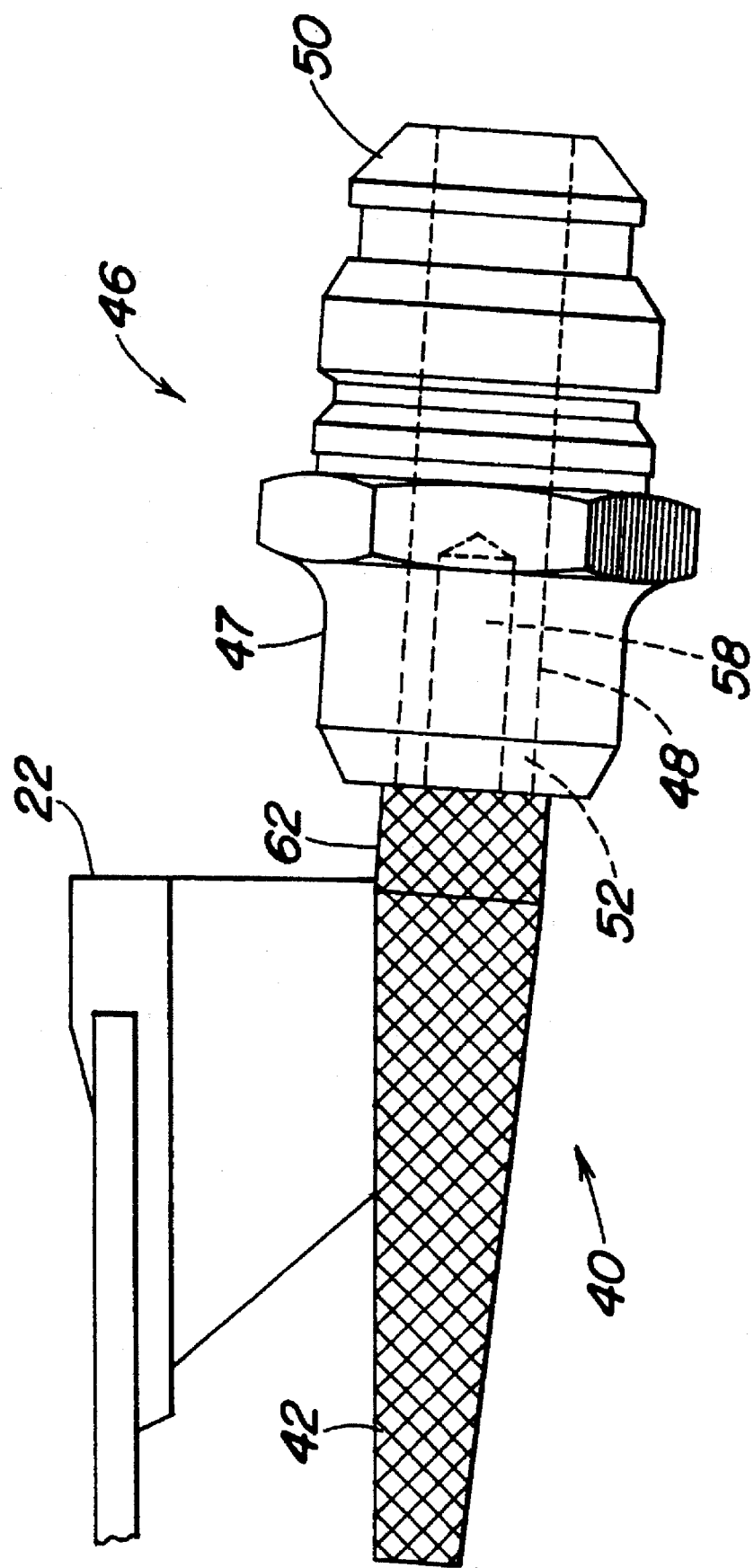
FIG. 2 is an enlarged side view of a portion of doffer and a grinding device utilized to replace one of the spindle assemblies in a row of spindles for truing the doffer.

After a period of operation, or upon replacement of the doffers 22, doffer truing may be necessary for proper doffer-spindle clearance the length of the doffer column. Doffer grinding assemblies or grinding stems 40 (FIG. 2) are provided to selectively replace one of the spindle assemblies in each of the rows of spindles 20. The grinding assembly 40 is substantially similar to the spindle assembly 18 that is to be replaced but does not have the typical dust collar 29. The assembly 40 has a special grinding surface 42 which is slightly larger in diameter than the normal cone-shaped picking surface of a conventional spindle so that the surface 42 will contact the doffer 22 when the remaining spindles 20 in the row are still slightly below the doffer. Each grinding assembly 40 includes a spindle nut and bushing assembly 46 with a spindle nut 47 having a threaded end which may be screwed into the spindle holes of the picker bar 21 on the drum 14 while the bar 21 and the doffer column 21 are still in the housing 12. A shaft 48 having an inner end with a bevel gear 50 which meshes with a corresponding gear 51 in the picker bar 16 is rotatably supported by the assembly 46. An outer tapped end 52 of the shaft 48 terminates near the outer end of the spindle nut 47 and receives a reduced diameter end 58 of a tapered special grinding member 62 defining the enlarged grinding surface 42. Preferably, the grinding surface 42 has a taper the same as the taper of the spindles 18 but has a diameter greater than that of the corresponding portion of the conventional spindle 20. The member 62 is nonrotatably secured within the tapped end 52 for rotation with the shaft 48 about the axis of the shaft as the bevel gear 50 is driven by the meshing gear 51 on the drive shaft within the picker bar 16. As shown in FIG. 2, the surface 42 has a rotary file or diamond type of pattern and preferably is made of a high speed steel for long life.

To true the doffers 22, one of the spindle assemblies 18 in each of a plurality of rows of the spindles 20 is removed and is replaced by the substitute assembly 40 (one assembly 40 is shown in FIG. 1). Preferably, all the spindle assemblies 18 in one of the bars 16 are replaced by the grinding assemblies 40 for the truing operation. The moistener column is moved out of the operating position so the enlarged surface 42 on the grinding member 62 does not damage the fins on the moistener pads. The row unit is operated so that each of the grinding assemblies 40 passes under the doffer 22 for the row of spindles. The doffer column 21 is gradually lowered using the adjusting assembly 24 until all of the doffers 22 have contacted the grinding surfaces 42 of the assemblies 40. Such contact is easily determined visually as a dust-like effect is produced at each doffer 22 while the grinding action is taking place. The row unit is run for a short period of time with the doffer column 21 in the vertical position wherein all the grinding surfaces 42 contact the corresponding doffers 22 as evidenced by dust from the grinding process at each doffer. The doffers 22 are quickly trued to the exact configuration of a spindle passing through the doffer column, and effects of doffer camber angle relative to the spindle are completely negated. After the doffers 22 are ground, the grinding assemblies 40 are removed from the picker bar 16, and the original spindle assemblies 18 are screwed back into the bar. Using the adjusting assembly 24, the vertical position of the doffer is then adjusted until the preselected vertical offset, preferably on the order of 0.005 inch or less (as close as possible but without the spindles 20 contacting the doffers 22), is obtained between the doffers 22 and the spindles 20.

In the alternate embodiment shown at 40' in FIG. 3, a special spindle-type of blank 72 is secured in the tapped end of the shaft 48. The blank 72 has the same taper as the spindle 20 but is larger in diameter than the spindle and has a smooth surface without the normal barbs and flutes of a typical spindle. The end of the blank 72 is tapped at 74. An abrasive sanding drum 78 has an inside surface generally conforming to the blank 72 and has an adhesive to secure the drum to the surface of the blank. A shouldered retaining screw 80 is inserted through the end of the drum 78 and is screwed into the tapped end 74 to hold the drum in place until the adhesive sets.

In the embodiment shown at 40" in FIG. 4, a shaft-like member 82 with a tapped end 84 is secured to the tapped end of the shaft 48, and a tapered grinding stone 88 is secured to the member 82 by a shoulder screw 90. The grinding stone 88 has the same taper as a production spindle but has a larger outer diameter than such a spindle.

Having described the preferred embodiment, it will become apparent that various modifications can be made without departing from the scope of the invention as defined in the accompanying claims.

We claim:

1. In a cotton harvester having an operable row unit with rows of spindles of preselected diameter and taper which pass adjacent a column of rotating doffers to unwrap cotton from the spindles, a method of truing the doffers so that a preselected clearance is provided between the rows of spindles and the doffers, the method comprising the steps of:

a. temporarily replacing at least one spindle in each row of spindles with a grinding device;

b. operating the row unit with the grinding device in place; and c. moving the doffers towards the rows of spindles so each of the doffers is contacted by a grinding device and grinding the doffer with the grinding device while the row unit is operating.

2. The method as set forth in claim 1 wherein the step of placing the grinding device includes removing one of the spindles of the preselected diameter and replacing the spindle with a substitute spindle device having a grinding surface with a diameter greater than the preselected diameter.

3. The method as set forth in claim 2 wherein the step of replacing the spindle includes replacing the spindle with a device having a sanding drum defining the grinding surface.

4. The method as set forth in claim 1 wherein the step of placing a grinding device includes supporting a spindle-like device in a spindle nut screwed into a spindle bar, the spindle-like device having a surface with a diameter greater than the preselected diameter.

5. The method as set forth in claim 3 wherein the step of replacing the spindle with a device includes replacing the spindle with spindle-shaped device and placing the sanding drum over the spindle-shaped device.

6. The method as set forth in claim 2 wherein the step of replacing the spindle with a substitute spindle device includes replacing the spindle with a grinding stone having a taper generally identical with the taper of the replaced spindle.

7. The method as set forth in claim 1 wherein the step of placing a grinding device includes placing a grinding device having a taper substantially identical to the taper of the spindle.

8. The method as set forth in claim 7 wherein the step of placing a grinding device includes placing a grinding device having a diameter greater than the diameter of the spindle.

9. The method as set forth in claim 1 further including the step of placing a grinding device in each row of spindles and adjusting the doffer column vertically so that most all the doffers are contacted by grinding devices.

10. In a cotton harvester having an operable row unit, the row unit including picker drum with a plurality of picker bars rotatably mounting replaceable picker spindle assemblies having spindles of preselected diameter and taper and rotatable about spindle axes, the spindles defining rows of picker spindles, and a doffer column with a column of doffers rotatable about an upright axis adjacent the drum, the doffer column adjustable vertically, wherein each row of spindles has a corresponding doffer rotatable a preselected distance from the spindles for unwrapping cotton from the spindles, a spindle device for truing the doffers comprising:

a replacement device adapted to replace at least one of the spindles in a row of spindles, the replacement device including a grinding surface having a taper generally conforming to the taper of the spindle, wherein the replacement device is generally spindle-shaped and has a diameter greater than the diameter of the spindle that is replaced so that the replacement device contacts the doffer while the remaining spindles in the row are offset from the doffer.

11. The invention as set forth in claim 10 wherein the replacement device comprises a spindle nut assembly rotatably supporting the grinding surface and selectively screwable into the spindle bar for rotation against the doffer as the row unit is operated.

12. The invention as set forth in claim 1 wherein the replacement device comprises a tapered grinding device having a taper generally identical to the spindle taper.

13. The invention as set forth in claim 10 wherein the replacement device comprises a sanding drum.

14. The invention as set forth in claim 10 wherein the replacement device comprises a rotary file device.

15. The invention as set forth in claim 10 wherein the replacement device comprises a grinding stone.

* * * * *